US000001375H

United States Statutory Invention Registration [19]

[11] Reg. Number: H1375

George

[43] Published: Nov. 1, 1994

[54] POLYKETONE POLYMER BLENDS

[75] Inventor: Eric R. George, Houston, Tex.

[73] Assignee: Shell Oil Company, Houston, Tex.

[21] Appl. No.: 775,405

[22] Filed: Oct. 15, 1991

[51] Int. Cl.[5] ..... C08L 23/00

[52] U.S. Cl. ..... 525/185; 525/240; 525/539

[58] Field of Search ..... 525/185, 539

[56] References Cited

U.S. PATENT DOCUMENTS

| | | | |
|---|---|---|---|
| 4,514,534 | 4/1985 | Di Nardo | 524/384 |
| 4,578,430 | 3/1986 | Davison | 525/387 |
| 4,707,524 | 11/1987 | Ehrig et al. | 525/387 |
| 4,816,514 | 3/1989 | Lutz | 525/55 |
| 4,843,144 | 6/1989 | Van Broekhoven et al. | 528/392 |
| 4,880,903 | 11/1989 | Van Broekhoven | 528/392 |

*Primary Examiner*—Robert L. Stoll

*Assistant Examiner*—Joseph D. Anthony

*Attorney, Agent, or Firm*—James D. Okorafor

[57] ABSTRACT

Improved compositions with a good balance of properties comprise polymer blends of a linear alternating polyketone polymer of carbon monoxide and at least one ethylenically unsaturated hydrocarbon with a cracked polyolefin polymer. The cracked polyolefin polymer is preferably a cracked polypropylene or polybutylene polymer.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYKETONE POLYMER BLENDS

FIELD OF THE INVENTION

This invention relates to polyketone blends, and, more particularly, to blends of a polyketone polymer and a cracked polyolefin polymer, preferably cracked polypropylene or polybutylene.

BACKGROUND OF THE INVENTION

Polyketone polymers are relatively high molecular weight materials having established utility as premium thermoplastics in the production of shaped articles, such as containers for food and beverages and parts for the automotive industry, which are produced by processing the polyketone polymer according to well known methods. For some particular applications, it is desirable to have properties which are somewhat different from those of the polyketone polymers. The more desirable properties of the polyketone polymers may be retained, and yet other properties improved, through the provision of a polymer blend. Blending one polymer with a less expensive polymer provides a less expensive polymer product, in addition to properties appropriate for various applications.

Polypropylene polymer, for example, is a relatively inexpensive polyolefin polymer with a good balance of properties, making it one of the top three plastics in the world on a volume production basis. However, the non-polar nature of polypropylene makes it difficult to blend with the polar polyketone polymers without the occurrence of gross phase separation.

It has been found that polypropylene polymers that have been cracked or degraded by contact with peroxides can be blended with polyketone polymers, without experiencing phase separation. The cracking process apparently introduces oxygen-containing groups into the polypropylene polymer chain, making it more compatible with the polar polyketone polymers. Blends of polyketone polymers which contain cracked polypropylene are expected to be particularly useful in packaging applications due to the superior water barrier properties exhibited by polypropylene.

It is an object of this invention to provide a blend of a polyketone polymer and a cracked polyolefin polymer.

SUMMARY OF THE INVENTION

The present invention provides blends of a linear alternating polyketone polymer of carbon monoxide and at least one ethylenically unsaturated hydrocarbon with a cracked polyolefin polymer. The uncracked polyolefin polymer has a polymer backbone that includes carbon atoms which have tertiary hydrogen atoms attached. Polyethylene, which crosslinks under cracking conditions, is excluded by this definition. The polyolefin is preferably an α-olefin, and preferably an olefin of three to about eight carbon atoms. More particularly, the invention provides a polyketone polymer blend containing from about 0.5 wt % to about 25 wt % cracked polyolefin, preferably from about 1 wt % to about 20 wt % cracked polyolefin, and most preferably from about 1 wt % to about 15 wt % cracked polyolefin. The cracked polyolefin polymer is preferably a cracked polypropylene or a cracked polybutylene polymer. The blends exhibit stiffness, as measured by flexural modulus, that is particularly surprising relative to the flexural modulus of the two blend components. The blends within the preferred range exhibit a good balance of properties useful for a variety of applications. The invention also provides blends of a cracked polyolefin polymer which contain a polyketone polymer as a minor component. The cracked polyolefin polymer is again preferably a cracked polypropylene or a cracked polybutylene polymer. The polyketone polymer is preferably present from about 5 wt % to about 15 wt %, based on total blend. Such preferred blends improve the Gardner impact strength of the cracked polyolefin polymer. The invention also includes articles manufactured from the blends of the invention.

DESCRIPTION OF THE INVENTION

The polyketone polymers used in the blends of the invention are of a linear alternating structure and contain substantially one molecule of carbon monoxide for each molecule of unsaturated hydrocarbon. Suitable ethylenically unsaturated hydrocarbons for use as monomers in the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydocarbons are styrene, p-methylstyrene, p-ethylstyrene and misopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a monomer of ethylene for each unit incorporating a monomer of the second hydrocarbon. Preferably, there will be from about 10 units to about 100 units incorporating a monomer of ethylene for each unit incorporating a monomer of the second hydrocarbon. The polymer chain of the preferred polyketone polymers is therefore represented by the repeating formula $$\left[CO\left(CH_2-CH_2\right)\right]_x\left[CO\left(G\right)\right]_y$$

wherein G is the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO\left(CH_2CH_2\right)-$ units and the $-CO\left(G\right)-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong nonhydrohalogenic acid and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a nonhydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The second component of the blends of the invention is a cracked polyolefin polymer. The term "cracked polyolefin" is well known to those skilled in the art. The polyolefins susceptible to cracking conditions are those having a polymer backbone that includes carbon atoms which have tertiary hydrogen atoms attached (i.e. a carbon atom that is attached to three other carbon atoms and only one hydrogen atom). Polyethylene, for example, does not have tertiary hydrogen atoms on the polymer backbone, and when subjected to cracking conditions, polyethylene exhibits crosslinking rather than cracking. The polyolefins subjected to cracking conditions are preferably $\alpha$-olefins, and preferably include from three to about eight carbon atoms. The polyolefins may be homopolymers or copolymers.

A cracked polyolefin results when a polyolefin is subjected to thermal and/or chemical processes to crack the heavier components, thereby narrowing the molecular weight distribution and increasing the melt flow index. The various cracking processes which may be useful herein include high temperature thermal cracking, peroxide cracking, and radiation cracking. Peroxide cracking is preferred.

Cracked polyolefin polymers may be distinguished from regular (or uncracked) polyolefin polymers by a variety of factors. Such polymers have a lower molecular weight than regular polyolefin polymers. Also, melt flow is higher for cracked polyolefins than for regular polyolefins. Melt flow may be defined as the amount, in grams per 10 minutes (g/10 min), of polymer which flows through a capillary with a relatively small length/diameter ratio under ASTM D1238 condition L at 230° C. Regular polypropylene polymers, for example, typically exhibit melt flows from about 1 to about 20 g/10 min, while cracked polypropylene exhibit melt flows of from about 15 g/10 min to as much as about 100 g/10 min, and typically from about 20 g/10 min to about 45 g/10 min.

The precise percentage of the cracked polyolefin to be employed in a polyketone blend of the invention will depend upon the anticipated end use for the blend. Compositions containing from about 0.5 wt % up to about 25 wt %, based on total blend, of the cracked polyolefin are believed to be satisfactory, with 1 wt % to 20 wt % being preferred, and 1 wt % to 15 wt % being most preferred.

The cracked polyolefin blended with the polyketone polymer is preferably a cracked polypropylene polymer or a cracked polybutylene polymer, and most preferably a cracked polypropylene polymer. Cracked polypropylenes of the type described in U.S. Pat. No. 4,578,430 (Davison), incorporated herein by reference, are particularly useful in this invention. Both cracked polypropylene and cracked polybutylenes are available from Shell Chemical Company.

Under some circumstances, it may be useful to include a polyketone polymer as a minor component in a cracked polyolefin polymer to improve the properties of the cracked polyolefin. For example, blends of cracked polypropylene containing from about 5 wt % to about 15 wt % of a polyketone polymer demonstrate improved Gardner impact strength.

This invention includes blends where the major component is a cracked polyolefin polymer, with a polyketone polymer present as a minor component, as well as blends where the polyketone polymer is a major component and a cracked polyolefin polymer is present as a minor component.

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyketone blend components.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped parts. Illustrative of such applications are the production of articles useful in both rigid and flexible packaging applications. Specific applications include films, containers, and bottles, which may be made by thermoforming injection or extrusion blow molding, etc.

The invention is further illustrated by the following Examples which should not be regarded as limiting.

strength, elongation, flexural modulus, and notched Izod and Gardner impact resistance. The results are shown in Table 1.

The flexural modulus results for the blends are particularly unexpected. Values for all of the binary blends are higher than what would be expected from the flexural modulus values for the polyketone and cracked polypropylene blend components using a rule of mixtures. While not wishing to be bound by any particular theory, it is speculated that the polyketone polymer acts as a nucleating agent for the cracked polypropylene, resulting in higher than expected crystallinity, and thereby higher modulus, for the binary blends. The good flexural modulus values also indicate compatibility and some adhesion between the blend components.

The values for tensile strength, elongation, and notched Izod are generally good over the entire range. However, the Gardner impact values dropped precipitously with increasing content of cracked polypropylene, which is a very brittle polymer. Blends containing 10 wt % polyketone significantly improved the Gardner impact for the cracked polypropylene.

The results indicate that polyketone polymers may be combined with as much as 20 wt % cracked polypropylene and maintain a good balance of properties, and that a cracked polypropylene that contains up to about 15 wt % polyketone exhibits a significant improvement in Gardner impact.

TABLE 1

| Composition (Polyketone/ Polypropylene) | Tensile, Impact, and Permeability Properties: Tensile Strength Yield (PSI) | Tensile Strength Break (PSI) | Elongation Yield (%) | Elongation Break (%) | Flexural Modulus (PSI) | Room Temperature Notched Izod (ft-lb/in) | Gardner Impact (in-lb) (−30° C.) |
|---|---|---|---|---|---|---|---|
| 100/0 | 8300 | 6400 | 35 | 223 | 226,000 | 1.72 | 222 |
| 90/10 | 6900 | 6300 | 31 | 51 | 227,000 | 1.56 | 148 |
| 80/20 | — | 5800 | — | 19 | 231,000 | 1.44 | 21.5 |
| 70/30 | 5600 | 5200 | 25 | 25 | 229,000 | 1.29 | 3.1 |
| 60/40 | — | 5000 | — | 17 | 224,000 | 1.11 | 2.3 |
| 50/50 | 4600 | 4500 | 12 | 13 | — | — | — |
| 40/60 | 4500 | 4300 | 12 | 13 | 214,000 | 0.55 | 2.3 |
| 30/70 | — | — | — | — | 219,000 | 0.38 | 2.5 |
| 20/80 | 4400 | 4200 | 12 | 13 | 208,000 | 0.41 | 2.8 |
| 10/90 | 4600 | 4400 | 13 | 17 | 207,000 | 0.41 | 14.3 |
| 0/100 | 4600 | 2800 | 18 | 679 | 174,000 | 0.46 | 2.7 |

EXAMPLE 1

A linear alternating terpolymer of carbon monoxide, ethylene, and propylene (89/052) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.1 dl/g when measured in m-cresol at 60° C. The polyketone polymer also contained conventional additives.

EXAMPLE 2

Blends were prepared of the polyketone terpolymer of Example 1 and a 20 melt flow, cracked polypropylene, WRS5-907, available from Shell Chemical Company. The blends prepared are shown in Table 1. The blends were compounded on a Haake 30 mm co-rotating twin screw extruder, operating at 250 RPM with a melt temperature of about 245° C. The extruded pellets were dried, then molded into family test specimens on a 25 ton Arburg injection molding machine. Molded specimens were stored over desiccant until tested. Mechanical testing was performed on "dry as molded" specimens. All blends were evaluated for tensile Other embodiments of the invention will be apparent to those skilled in the art from a consideration of this specification, or by practice of the invention described herein. It is intended that the specification and examples be considered exemplary only, with the true scope and spirit of the invention being indicated by the following claims.

What is claimed is:

1. A polymer blend comprising a major proportion of a linear alternating polyketone polymer and from about 0.5 wt % to about 25 wt %, based on total blend, of a cracked polypropylene polymer which exhibits a melt flow index of at least about 20 grams/10 minutes.

2. The composition of claim 1 wherein the polyketone polymer is represented by repeating formula $$\left[CO\left[CH_2-CH_2\right]\right]_x\left[CO\left[G\right]\right]_y$$

wherein G is a monomer of an ethylenically unsaturated hydrocarbon of at least 3 carbon atoms polymerized through the ethylenic unsaturation and the ratio of y:x is no more than about 0.5.

3. The composition of claim 2 wherein G is a monomer of propylene and the ratio of y:x is from about 0.01 to about 0.1.

4. The composition of claim 3 wherein the cracked polypropylene comprises from about 1 wt % to about 20 wt % of the total blend.

5. The composition of claim 2 wherein y is zero.

6. The composition of claim 5 wherein the cracked polypropylene comprises from about 1 wt % to about 20 wt % of the total blend.

7. The composition comprising a blend of:

a linear alternating polyketone polymer, wherein the linear alternating polymer is represented by the repeating formula $$\left[CO\left(CH_2-CH_2\right)\right]_x\left[CO\left(G\right)\right]_y$$

wherein G is a moiety of an ethylenically unsaturated hydrocarbon of at least 3 carbon atoms polymerized through the ethylenic unsaturation and the ratio of y:x is no more than about 0.5; and from about 1 wt % to about 20 wt %, based on the total blend, of a cracked polypropylene polymer which exhibits a melt flow index of at least about 20 grams/10 minutes.

8. The composition of claim 7 wherein the cracked polypropylene comprises from about 1 wt % to about 15 wt % of the total blend.

9. An article manufactured from the composition of claim 7.

10. The composition of claim 7 wherein y is zero.

11. The composition of claim 10 wherein the cracked polypropylene comprises from about 1 wt % to about 15 wt % of the total blend.

12. A polymer blend comprising a major proportion of a cracked polyolefin polymer which exhibits a metal flow index of at least about 20 grams/10 minutes and from about 5 wt % to about 15 wt %, based on total blend, of a linear alternating polypropylene polymer.

13. An article manufactured from the composition of claim 12.

14. The composition of claim 12 wherein the polyketone polymer is represented by the repeating formula $$\left[CO\left(CH_2-CH_2\right)\right]_x\left[CO\left(G\right)\right]_y$$

wherein G is a monomer of an ethylenically unsaturated hydrocarbon of at least 3 carbon atoms polymerized trough the ethylenic unsaturation and the ratio of y:x is no more than about 0.5.

15. The composition of claim 14 wherein G is a monomer of propylene and the ratio of y:x is from about 0.01 to about 0.1.

16. The composition of claim 15 wherein the cracked polyolefin polymer is a cracked polypropylene polymer or a cracked polybutylene polymer.

17. The composition of claim 14 wherein y is zero.

18. The composition of claim 17 wherein the cracked polyolefin polymer is a cracked polypropylene polymer or a cracked polybutylene polymer.

* * * * *